(12) United States Patent
Suzuki

(10) Patent No.: US 6,208,479 B1
(45) Date of Patent: Mar. 27, 2001

(54) MAGNETIC DISK APPARATUS

(75) Inventor: Katsuzi Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/324,521

(22) Filed: Jun. 2, 1999

(30) Foreign Application Priority Data

Jun. 9, 1998 (JP) .................................................. 10-160193

(51) Int. Cl.[7] ....................................................... G11B 5/09
(52) U.S. Cl. .................................................. 360/51; 360/48
(58) Field of Search .......................... 360/48, 51; 369/48, 369/59

(56) References Cited

FOREIGN PATENT DOCUMENTS 2-265073   10/1990   (JP) .

*Primary Examiner*—Andrew L. Sniezek
*Assistant Examiner*—Regina Y. Neal
(74) *Attorney, Agent, or Firm*—Brinks Hofer Gilson & Lione

(57) ABSTRACT

A couple of data sectors P, Q are arranged in one data pulse consisting of data sector pulses a, b. In this case, data sectors P, Q are respectively composed of an area having sync fields, address marks, data and error correction codes, and recording density may be raised by increasing the clock frequency in the magnetic disk apparatus to increase the write frequency.

4 Claims, 2 Drawing Sheets

MAGNETIC DISK APPARATUS

BACKGROUND OF THE INVENTION

1. Field of the Invention

The present invention relates to a magnetic disk apparatus which can realize higher recording density of a magnetic disk without requiring a large scale modification of hardware of the magnetic disk apparatus of the related art.

2. Description of the Related Art

FIG. 3 is a diagram for explaining a method of recording and reproducing data of a magnetic disk apparatus of the related art.

In the magnetic disk apparatus illustrated in FIG. 3, a timing signal recorded together with a servo signal for tracking is read to a hard disk or flexible disk and data sector pulses a, b are generated on the basis of this timing signal. In the writing operation, recording is performed in such a manner that one data sector R is stored to an area 10 between the data sector pulses a and b. On the occasion of writing the data, writing control of data sector R is conducted with reference to the data sector pulse a in the disk controller (control means) provided within the magnetic disk apparatus. In usual, one data sector F is recorded next to one data sector pulse a.

The data sector R is formed of the areas of sync field (Sync) 11, address mark (AM) 12, data (DATA) 13 and error correction code (ECC) 14 in a row.

In the readout operation, the sync field 11 is synchronized to the target data sector R, the address mark 12 is detected, data in the area of the subsequent data (DATA) 13 is read and error correction is made to the data read by the error correction code (ECC) 14.

However, in the magnetic disk apparatus of the related art described above, it has been difficult to increase the capacity of the data to be recorded because only one data section can be recorded for one data sector pulse.

Usually, an interval between the data sector pulses a and b must be narrowed to increase the capacity of data to be recorded to a magnetic disk by raising the recording density. The timing for generating the data sector pulse therefore must be changed for such purpose and thereby raises a problem that specification of interface and hardware must be changed.

Moreover, capacity of one data sector is limited depending on the specification of the interface. Only the data of limited capacity therefore can be input to one data sector even when the recording frequency of data for the magnetic disk is increased.

OBJECT AND SUMMARY OF THE INVENTION

The present invention has been proposed to solve the problems explained above and it is therefore an object of the present invention to provide a magnetic disk apparatus which can increase the data recording capacity without large-scale modification of hardware and changes of interface specifications.

DESCRIPTION OF THE PREFERRED EMBODIMENT

A magnetic disk apparatus of the present invention will be explained with reference to FIG. 1 and FIG. 2.

Figure 1:
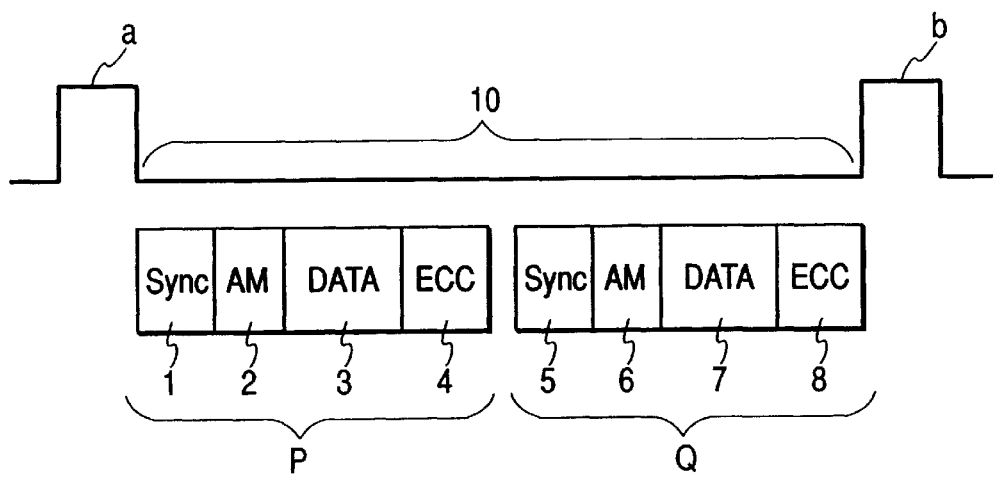
FIG. 1 is a diagram for explaining a method of recording and reproducing data.

FIG. 1 is a diagram for explaining a method of recording and reproducing data to and from a magnetic disk.

The data sector pulses indicated by the codes a, b are generated on the basis of the timing signal being recorded to a magnetic disk such as a hard disk or flexible disk. In an area 10 (one sector) formed between the data sector pulse a and a neighboring data sector pulse b, a couple of data sectors P, Q are arranged.

The data sector P is composed of the area in which sync field (Sync) 1, address mark (AM) 2, data (DATA) 3 and error correction code (ECC) 4 are continuously and sequentially formed. Moreover, the data sector Q is also formed following the data sector P and this data sector Q is also composed, like the data sector P, of the area in which the synch field 5, address mark 6, data 7 and error correction code 8 are continuously formed.

As explained above, a couple of data sectors are arranged between one data sector pulse, and a couple of data sectors are also arranged between the other data sector pulses.

The sync fields 1, 5 in the data sectors P, Q are synchronous signals for synchronizing the read data and are individually formed in each data sector. The address marks 2, 6 indicate start of respective data positions. Data 3, 7 are areas to which the data itself transferred from the host is entered. The error correction codes 4, 8 are used to repair an error when the error occurs because of read operation failure at the time of read operation. Although not illustrated in the figure, the circuit of FIG. 2 is connected with a clock which generates the clock frequency to determine the transfer rate of the data writing and reading operation.

In a data recording and reproducing method illustrated in FIG. 1, the data sectors P and Q are formed in the area 10 (one data sector pulse) formed between the data sector pulses a and b.

The data sectors P and Q are not written continuously to the magnetic disk but the front side data sector P is written next to the data sector pulse a by the first rotation and the rear side data sector Q is written during the subsequent rotation of the magnetic disk.

In this case, the data sector Q is written after skipping as many as the number of bytes of the data length of data sector P. Moreover, in the case of reading the written data sector Q, reading is performed after skipping as many as the number of bytes of the data sector P.

Figure 2:
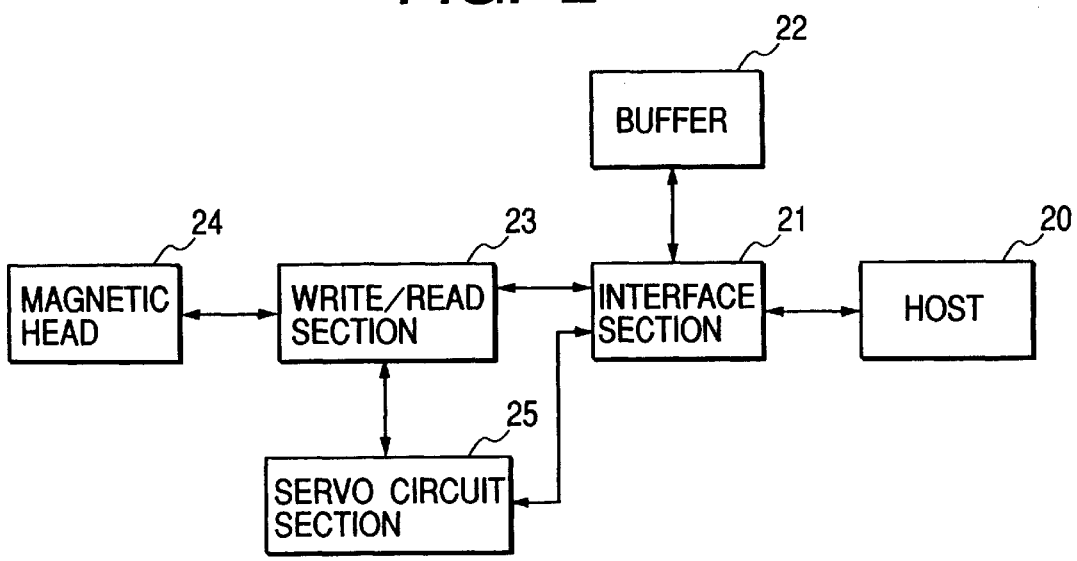
FIG. 2 is a block diagram illustrating a circuit within the magnetic disk apparatus of the present invention.

FIG. 2 is a block diagram of a magnetic disk apparatus.

The magnetic disk apparatus illustrated in FIG. 2 is connected via the host (computer) 20 and interface 21. The interface 21 is connected with a buffer 22, a read/write controller 23 and a servo circuit 25. Data transfer is performed between the read/write controller 23 and magnetic head 24.

The data transferred from the host 20 is tentatively stored in the buffer 22 before it is written to the magnetic disk and the data in the buffer 22 is sent to the read/write controller 23 after it has reached the predetermined capacity. Moreover, the data read from the magnetic disk is sent to the buffer 22 from the read/write controller 23. After it has reached the predetermined amount, this data is then transferred to the host 20. As the buffer 22, a host buffer and a disk buffer are individually provided.

Capacity of the buffer 22 is previously determined depending on each hardware and when capacity is large, a lot of data can be transferred at a time to or from the host 20. Moreover, the data transfer rate for the host 20 is determined by the specification of the interface 21.

The read/write controller 23 reads in serial the data stored in the buffer 22 at the time of writing operation and sends the data formatted with addition of sync field (SYNC) 1, address mark (AM) 2 and error correction code (ECC) 4 to the magnetic head 24. The timing of transmitting the signal to this magnetic head 24 is synchronized with the data sector pulses a, b. Moreover, in the data reading operation, error of the data (DATA) of signal read by the magnetic head 24 is corrected and only the data (DATA) is sent to the buffer 22. After the data of the predetermined amount is stored in the buffer 22, this data is then transferred to the host 20.

A servo circuit 25 processes the servo signal read from the magnetic disk to execute the tracking control of the magnetic head 24 and also gives the timing signal which is read together with the servo signal in the servo circuit 25 to the read/write controller 23 in order to generate the data sector pulses a, b in the controller 23.

Figure 3:
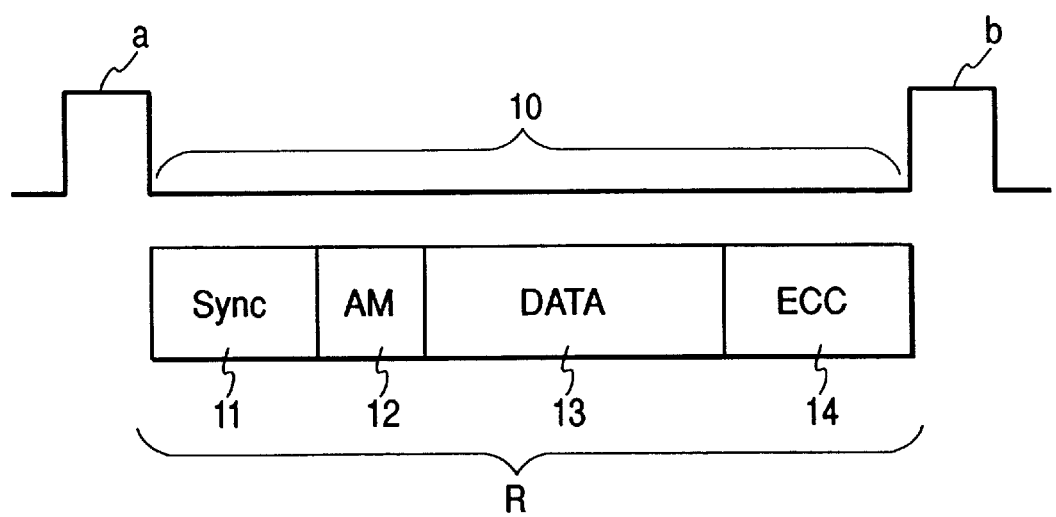
FIG. 3 is a diagram for explaining a method of recording and reproducing data of the related art.

In the magnetic disk apparatus of the present invention, the number of rotations of the magnetic disk is the same as that in the reading and writing method of the related art illustrated in FIG. 3 but the amount of data twice as large as that of the related art is recorded between data sector pulses. This process can be realized by setting the clock frequency given to the read/write controller 23 to twice as high as that of the related art and then setting the signal sending rate to the magnetic head 24 from the read/write controller 23 to a higher value.

Data reading and writing to and from the magnetic disk are performed by the method of reading and writing data to the magnetic disk apparatus explained above. As illustrated in FIG. 1, the data sector pulses a, b are generated by the timing signal read from the magnetic disk and the data sectors P and Q are formatted, in this timing, in one data sector pulse (one data sector) of the data sector pulses a and b using the data sector pulse a as the trigger signal and is then written into the magnetic disk. During the reading operation, the data sectors P and Q are read in different timings.

In this case, a two-interleave system is employed so that one track (area between one data sector pulse) is accessed in different timings with a couple of rotations.

During the write operation, data is written to the front side data sector P in synchronization with the data sector pulse a by the first rotation. In the second rotation, data is written in the rear side data sector Q. In this case, access is made to the rear side data sector Q for starting the write operation after counting and skipping as many bytes as the length of front side data sector. Moreover, in the data reading operation, access is made to the data sector P in the first rotation and access is then made to the data sector Q in the second rotation. In this case, on the occasion of reading the data sector Q, skip is made as many as the number of bytes of the data sector P.

The magnetic disk apparatus of the present invention explained above can be applied to a magnetic disk apparatus used for games, a magnetic disk apparatus which assures replacement of low and high capacity type media and a magnetic disk apparatus using a hard type disk.

Moreover, a couple of data sectors are arranged in one data sector pulse but three or more data sectors may also be arranged by increasing the write frequency.

What is claimed is:

1. A magnetic disk apparatus comprising a magnetic head, a buffer for holding the read data from said magnetic head and the write data from a host apparatus and a controller for controlling the recording and reproducing position of data by generating the data pulse on the basis of the timing signal recorded in said magnetic disk, wherein said controller controls the write operation to arrange a plurality of.

2. The magnetic disk apparatus according to claim 1, wherein said controller raises data recording density by increasing the clock frequency at the time of data writing operation.

3. The magnetic disk apparatus according to claim 1, wherein a couple of data sectors, each of which includes a sync area for synchronization of data, an address mark area indicating data recording start position, a data area for recording data and error correction code area, are recorded in one data sector pulse, one of a couple of data sectors is accessed during single rotation of the magnetic disk, and thereafter the other data sector is accessed during the other rotation of the magnetic disk.

4. The magnetic disk apparatus according to claim 1, wherein at least one data area of a plurality of data sectors recorded in one data sector pulse is set to have the same amount of data as the capacity of the buffer.

* * * * *

UNITED STATES PATENT AND TRADEMARK OFFICE
CERTIFICATE OF CORRECTION

PATENT NO. : 6,208,479 B1
DATED : March 27, 2001
INVENTOR(S) : Katsuzi Suzuki

It is certified that error appears in the above-identified patent and that said Letters Patent is hereby corrected as shown below:

<u>Title page,</u>
Item [54], after "APPARATUS" insert -- COMPRISING A PLURALITY OF COMPLETE DATA SECTORS BETWEEN TWO DATA SECTOR PULSES --.

<u>Column 4,</u>
Line 7, after "plurality of" insert -- complete data sectors between two data sector pulses --.

Signed and Sealed this

Sixth Day of August, 2002

Attest:

Attesting Officer

JAMES E. ROGAN
*Director of the United States Patent and Trademark Office*